US012718001B2

(12) United States Patent
Johnston et al.

(10) Patent No.: US 12,718,001 B2
(45) **Date of Patent: *Aug. 25, 2026**

(54) DOCUMENT PROCESSING SERVICE FOR DISPLAYING COMMENTS INCLUDED IN MESSAGES

(71) Applicant: Google LLC, Mountain View, CA (US)

(72) Inventors: Scott M. Johnston, Darien, CT (US); Mandy Richau Sladden, Lafayette, CO (US); Ian Gunn, San Anselmo, CA (US); Nicholas Cooper, Annadale (AU)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,354

(22) Filed: Oct. 26, 2022

(65) Prior Publication Data

US 2023/0050784 A1 Feb. 16, 2023

Related U.S. Application Data

(63) Continuation of application No. 16/272,340, filed on Feb. 11, 2019, now Pat. No. 11,669,674, which is a (Continued)

(51) Int. Cl.
*G06F 40/134* (2020.01)
*G06F 40/10* (2020.01)
(Continued)

(52) U.S. Cl.
CPC ............ *G06F 40/134* (2020.01); *G06F 40/10* (2020.01); *G06F 40/166* (2020.01); *G06F 40/169* (2020.01); *H04L 51/046* (2013.01)

(58) Field of Classification Search
CPC ....... G06F 40/169; G06F 40/134; G06F 40/10
See application file for complete search history.

(56) References Cited

U.S. PATENT DOCUMENTS

| | | | |
|---|---|---|---|
| 4,889,439 | A | 12/1989 | Cook et al. |
| 5,111,397 | A | 5/1992 | Chirokas et al. |

(Continued)

FOREIGN PATENT DOCUMENTS

| | | | |
|---|---|---|---|
| CN | 101123503 | A | 2/2008 |
| CN | 101179572 | A | 5/2008 |

(Continued)

OTHER PUBLICATIONS

Right Source, "How to Use Twitter, for Beginners" published Dec. 2, 2010, p. 1-7 and cover page, retrieved from https://www.rightsourcemarketing.com/social-media/how-to-use-twitter-for-beginners (Year: 2010).*

(Continued)

*Primary Examiner* — Tuyetlien T Tran
(74) *Attorney, Agent, or Firm* — Lowenstein Sandler LLP

(57) ABSTRACT

Content of a first comment corresponding to an electronic document provided by an online document service is received from a first client device associated with a first user. The content of the first comment includes a particular symbol followed by one or more characters that represent a second user. The content of the first comment corresponding to the electronic document is analyzed to determine one or more user addresses. A notification indicating the first comment has been received is sent to a second client device associated with the second user using the determined one or more user addresses.

17 Claims, 11 Drawing Sheets

Related U.S. Application Data continuation of application No. 14/673,809, filed on Mar. 30, 2015, now Pat. No. 10,204,086, which is a continuation of application No. 13/249,442, filed on Sep. 30, 2011, now Pat. No. 8,996,985.

(60) Provisional application No. 61/453,238, filed on Mar. 16, 2011.

(51) Int. Cl.
*G06F 40/166* (2020.01)
*G06F 40/169* (2020.01)
*H04L 51/046* (2022.01)

(56) References Cited

U.S. PATENT DOCUMENTS 5,167,013 A 11/1992 Hube et al.
5,185,818 A 2/1993 Warnock
5,214,755 A 5/1993 Mason
5,231,577 A 7/1993 Koss
5,379,373 A 1/1995 Hayashi et al.
5,381,523 A 1/1995 Hayashi
5,408,470 A 4/1995 Rothrock
5,457,654 A 10/1995 McLaury
5,528,743 A 6/1996 Tou et al.
5,557,722 A 9/1996 DeRose
5,675,788 A 10/1997 Husick et al.
5,694,609 A 12/1997 Murata
5,708,826 A 1/1998 Ikeda
5,758,358 A 5/1998 Ebbo
5,761,669 A 6/1998 Montague
5,781,732 A 7/1998 Adams
5,793,966 A 8/1998 Amstein
5,799,325 A 8/1998 Rivette
5,819,304 A 10/1998 Nilsen
5,825,987 A 10/1998 Asada
5,859,648 A 1/1999 Moore et al.
5,860,073 A 1/1999 Ferrel et al.
5,895,476 A 4/1999 Orr et al.
5,923,848 A 7/1999 Goodhand
5,930,813 A 7/1999 Padgett et al.
5,956,736 A 9/1999 Hanson et al.
5,999,932 A 12/1999 Paul
6,006,239 A 12/1999 Bhansali et al.
6,016,150 A 1/2000 Lengyel et al.
6,023,715 A 2/2000 Burkes et al.
6,025,836 A 2/2000 McBride
6,049,664 A 4/2000 Dale
6,061,697 A 5/2000 Nakao
6,073,144 A 6/2000 van Hoff
6,073,147 A 6/2000 Chan et al.
6,169,999 B1 1/2001 Kanno
6,185,591 B1 2/2001 Baker et al.
6,243,706 B1 6/2001 Moreau
6,275,223 B1 8/2001 Hughes
6,279,151 B1 8/2001 Breslau et al.
6,327,584 B1 12/2001 Xian
6,341,305 B2 1/2002 Wolfe
6,349,308 B1 2/2002 Whang
6,349,314 B1 2/2002 Patel
6,377,354 B1 4/2002 Nguyen et al.
6,377,957 B1 4/2002 Jeyaraman
6,418,441 B1 7/2002 Call
6,424,828 B1 * 7/2002 Collins .................. H04W 8/26 455/445
6,438,564 B1 8/2002 Morton
6,501,779 B1 12/2002 McLaughlin
6,512,531 B1 1/2003 Gartland
6,525,747 B1 2/2003 Bezos
6,544,294 B1 4/2003 Greenfield
6,552,728 B1 4/2003 Moore et al.
6,564,246 B1 5/2003 Varma et al.
6,636,889 B1 10/2003 Estrada et al.
6,681,369 B2 1/2004 Meunier et al.
6,717,593 B1 4/2004 Jennings
6,766,333 B1 7/2004 Wu
6,879,997 B1 4/2005 Ketola et al.
6,898,642 B2 5/2005 Chafle et al.
6,907,565 B1 6/2005 Huang
6,972,748 B1 12/2005 Lang
6,988,241 B1 1/2006 Guttman
7,003,327 B1 * 2/2006 Payne ................ H04M 1/2748 455/67.7
7,009,626 B2 3/2006 Anwar
7,017,112 B2 3/2006 Collie
7,031,954 B1 4/2006 Kirsch
7,035,910 B1 4/2006 Dutta
7,069,502 B2 6/2006 Numata
7,069,541 B2 6/2006 Dougherty et al.
7,076,730 B1 7/2006 Baker
7,106,469 B2 9/2006 Simpson et al.
7,107,518 B2 9/2006 Ramaley
7,162,693 B2 1/2007 Yamanaka
7,181,497 B1 2/2007 Appelman
7,213,199 B2 5/2007 Humenansky
7,222,156 B2 5/2007 Gupta
7,231,597 B1 6/2007 Braun et al.
7,233,951 B1 6/2007 Gainer et al.
7,257,767 B1 8/2007 Carden, Jr.
7,263,497 B1 8/2007 Wiser
7,272,782 B2 9/2007 Sneh
7,284,199 B2 10/2007 Parasnis et al.
7,305,613 B2 12/2007 Oezgen
7,325,199 B1 1/2008 Reid
7,328,243 B2 2/2008 Yeager
7,350,142 B2 3/2008 Kraft
7,370,066 B1 5/2008 Sikchi et al.
7,386,535 B1 6/2008 Kalucha et al.
7,437,421 B2 10/2008 Bhogal
7,467,192 B1 12/2008 Lemler et al.
7,478,330 B1 1/2009 Branson
7,487,448 B2 2/2009 Emerson et al.
7,491,399 B2 2/2009 Vakharia
7,506,242 B2 3/2009 Kotler
7,516,114 B2 4/2009 Dieberger et al.
7,519,630 B2 4/2009 Brown et al.
7,529,778 B1 5/2009 Dewey
7,536,633 B2 5/2009 Faraday
7,587,666 B2 9/2009 Delvat et al.
7,624,145 B2 11/2009 Junuzovic et al.
7,634,728 B2 12/2009 Kraft
7,656,543 B2 2/2010 Atkins
7,667,862 B2 2/2010 Ziegler
7,680,932 B2 3/2010 Defaix
7,681,135 B2 3/2010 Madhavarao et al.
7,698,280 B2 4/2010 Bhat et al.
7,698,379 B2 4/2010 Dutta
7,698,636 B2 4/2010 Mohamed
7,712,016 B2 5/2010 Jones et al.
7,737,996 B2 6/2010 Gerhard
7,756,824 B2 7/2010 Campbell et al.
7,761,796 B2 7/2010 Faraday
7,769,810 B1 8/2010 Kaufman
7,774,703 B2 8/2010 Junuzovic
7,779,346 B2 8/2010 Buczek
7,788,647 B2 8/2010 Martin et al.
7,792,788 B2 9/2010 Melmon et al.
7,814,407 B1 10/2010 Danner et al.
7,818,678 B2 10/2010 Massand
7,818,679 B2 10/2010 Clarke
7,827,483 B2 11/2010 Unbedacht et al.
7,836,148 B2 11/2010 Popp et al.
7,890,928 B2 2/2011 Patrudu
7,904,515 B2 3/2011 Ambati et al.
7,908,247 B2 3/2011 Ngo et al.
7,917,554 B2 3/2011 Hull et al.
7,920,894 B2 4/2011 Wyler
7,937,663 B2 5/2011 Parker
7,941,399 B2 5/2011 Bailor
7,953,696 B2 5/2011 Davis et al.
7,958,448 B2 6/2011 Fattic, II et al.
7,966,426 B2 6/2011 Smith et al.
7,982,737 B2 7/2011 Leroy

(56) References Cited

U.S. PATENT DOCUMENTS 8,001,215 B2 8/2011 Dominowska et al.
8,005,858 B1 8/2011 Lynch et al.
8,006,174 B2 8/2011 Aureglia et al.
8,019,780 B1 9/2011 Pinkerton
8,044,961 B2 10/2011 Opstad et al.
8,065,604 B2 11/2011 Blankinship
8,108,464 B1 1/2012 Rochelle
8,151,204 B2 4/2012 Lusen
8,185,910 B2 5/2012 Swildens
8,234,620 B1 7/2012 Bychkov et al.
8,255,789 B2 8/2012 Berger et al.
8,266,534 B2 9/2012 Curtis
8,271,470 B2 9/2012 Gonzalez et al.
8,307,119 B2 11/2012 Rochelle et al.
8,417,666 B2 4/2013 Bailor et al.
8,464,164 B2 6/2013 Hon
8,484,561 B1 7/2013 Lemonik et al.
8,566,708 B1 10/2013 Pereira et al.
8,595,622 B1 11/2013 Pereira et al.
8,601,436 B2 12/2013 Park et al.
8,621,012 B2 12/2013 Jackson
8,621,021 B2 12/2013 Provo
8,640,048 B1 1/2014 Parsons
8,700,986 B1 4/2014 Pereira et al.
8,738,706 B1 5/2014 Grieve et al.
8,892,994 B2 11/2014 Pereira et al.
8,943,399 B1 1/2015 Pereira et al.
8,966,362 B2 2/2015 Smetters
9,286,276 B2 3/2016 Cairns et al.
9,286,935 B1 3/2016 Wilder
9,292,481 B2 3/2016 Mangini
9,336,137 B2 5/2016 Day-Richter et al.
9,398,731 B1 7/2016 Imwalle et al.
2001/0004256 A1 6/2001 Iwata et al.
2001/0037346 A1 11/2001 Johnson
2002/0010725 A1 1/2002 Mo
2002/0023110 A1 2/2002 Fortin et al.
2002/0032701 A1 3/2002 Gao
2002/0035580 A1 3/2002 Tanabe
2002/0042838 A1 4/2002 Tabayoyon
2002/0051185 A1 5/2002 Yamaguchi
2002/0099777 A1 7/2002 Gupta
2002/0129054 A1 9/2002 Ferguson et al.
2002/0133492 A1 9/2002 Goldstein
2002/0143780 A1 10/2002 Gorman
2002/0156803 A1 10/2002 Maslov
2002/0174085 A1 11/2002 Nelson
2002/0188631 A1 12/2002 Tiemann
2002/0194302 A1 12/2002 Blumberg
2003/0009528 A1 1/2003 Sharif
2003/0014406 A1 1/2003 Faieta
2003/0037076 A1 2/2003 Bravery
2003/0037303 A1 2/2003 Bodlaender
2003/0061349 A1 3/2003 Lo et al.
2003/0070176 A1 4/2003 Parker
2003/0084078 A1 5/2003 Torii
2003/0105719 A1 6/2003 Berger
2003/0115268 A1 6/2003 Esposito
2003/0140315 A1 7/2003 Blumberg et al.
2003/0145279 A1 7/2003 Bourbakis
2003/0179230 A1 9/2003 Seidman
2003/0208541 A1 11/2003 Musa
2004/0015781 A1 1/2004 Brown et al.
2004/0030697 A1 2/2004 Cochran
2004/0044965 A1 3/2004 Toyama
2004/0051736 A1 3/2004 Daniell
2004/0059783 A1 3/2004 Kazui
2004/0064733 A1 4/2004 Gong
2004/0085354 A1 5/2004 Massand
2004/0088374 A1 5/2004 Webb
2004/0088653 A1 5/2004 Bell
2004/0107296 A1 6/2004 Donker et al.
2004/0133444 A1 7/2004 Defaix
2004/0172423 A1 9/2004 Kaasten et al.
2004/0172450 A1 9/2004 Edelstein
2004/0194028 A1 9/2004 O'Brien
2004/0205538 A1 10/2004 Banerjee et al.
2004/0205664 A1 10/2004 Prendergast
2004/0215672 A1 10/2004 Pfitzner
2004/0215825 A1 10/2004 Pfitzner
2004/0215826 A1 10/2004 Pfitzner
2004/0216090 A1 10/2004 Kaler
2004/0220977 A1 11/2004 Cho et al.
2004/0239700 A1 12/2004 Baschy
2004/0248612 A1 12/2004 Lee
2004/0255005 A1 12/2004 Spooner
2004/0261053 A1 12/2004 Dougherty et al.
2004/0267871 A1 12/2004 Pratley
2004/0268237 A1 12/2004 Jones
2005/0034068 A1 2/2005 Jaeger
2005/0039123 A1 2/2005 Kuchinsky et al.
2005/0055337 A1 3/2005 Bebo
2005/0091291 A1 4/2005 Kaler
2005/0097061 A1 5/2005 Shapiro
2005/0102370 A1 5/2005 Lin et al.
2005/0125461 A1 6/2005 Filz
2005/0131887 A1 6/2005 Rohrabaugh
2005/0144256 A1 6/2005 Blumberg
2005/0177261 A1 8/2005 Durbin
2005/0177621 A1 8/2005 Moody et al.
2005/0177805 A1 8/2005 Lynch et al.
2005/0185636 A1 8/2005 Bucher
2005/0188051 A1 8/2005 Sneh
2005/0198305 A1 9/2005 Pezaris
2005/0198612 A1 9/2005 Gonzalez
2005/0200896 A1 9/2005 Narusawa
2005/0209914 A1 9/2005 Nguyen
2005/0216504 A1 9/2005 Delvat et al.
2005/0216827 A1 9/2005 Mochizuki
2005/0223063 A1 10/2005 Chang et al.
2005/0234943 A1 10/2005 Clarke
2005/0273695 A1 12/2005 Schnurr
2006/0020670 A1 1/2006 Anderson
2006/0031751 A1 2/2006 Ehud
2006/0036692 A1 2/2006 Morinigo
2006/0053196 A1 3/2006 Spataro et al.
2006/0075332 A1 4/2006 Fairweather
2006/0080432 A1 4/2006 Spataro
2006/0080595 A1 4/2006 Chavoustie et al.
2006/0095527 A1 5/2006 Malik
2006/0101071 A1 5/2006 Henderson
2006/0129627 A1 6/2006 Phillips
2006/0136511 A1 6/2006 Ngo et al.
2006/0136513 A1 6/2006 Ngo
2006/0136817 A1 6/2006 Burago et al.
2006/0149831 A1 7/2006 Dutta
2006/0168044 A1 7/2006 Chen
2006/0195784 A1 8/2006 Koivisto et al.
2006/0200755 A1 9/2006 Melmon
2006/0206500 A1 9/2006 Komamura
2006/0206814 A1 9/2006 Tonomura et al.
2006/0230344 A1 10/2006 Jennings
2006/0235933 A1 10/2006 Baluja
2006/0248129 A1 11/2006 Carnes
2006/0265639 A1 11/2006 Merrill et al.
2006/0282762 A1 12/2006 Diamond
2007/0033654 A1 2/2007 Wilson
2007/0061714 A1 3/2007 Stuple
2007/0070066 A1 3/2007 Bakhash
2007/0089053 A1 4/2007 Uhlig et al.
2007/0094601 A1 4/2007 Greenberg et al.
2007/0106729 A1 5/2007 Adams
2007/0118598 A1 5/2007 Bedi
2007/0118797 A1 5/2007 Layzell
2007/0143425 A1 6/2007 Kieselbach
2007/0162840 A1 7/2007 Rochelle
2007/0186157 A1 8/2007 Walker
2007/0208992 A1 9/2007 Koren
2007/0220068 A1 9/2007 Thompson
2007/0233459 A1 10/2007 Perronnin
2007/0233811 A1 10/2007 Rochelle
2007/0239695 A1 10/2007 Chakra et al.
2007/0288637 A1 12/2007 Layton
2008/0010372 A1 1/2008 Khedouri

(56) References Cited

U.S. PATENT DOCUMENTS

2008/0028302 A1 1/2008 Meschkat
2008/0028314 A1* 1/2008 Bono .................. G11B 27/034 704/235
2008/0033996 A1 2/2008 Kesari
2008/0040659 A1 2/2008 Doyle
2008/0059417 A1 3/2008 Yamada
2008/0059539 A1 3/2008 Chin
2008/0082604 A1 4/2008 Mansour
2008/0082938 A1 4/2008 Buczek
2008/0092066 A1 4/2008 Edlund et al.
2008/0114720 A1 5/2008 Smith et al.
2008/0126943 A1 5/2008 Parasnis
2008/0127212 A1 5/2008 Nakamizo
2008/0201449 A1 8/2008 Huang et al.
2008/0222273 A1 9/2008 Lakshmanan
2008/0242353 A1 10/2008 Willey
2008/0301560 A1 12/2008 Rogers
2009/0006466 A1 1/2009 Ellis et al.
2009/0006936 A1 1/2009 Parker et al.
2009/0049140 A1* 2/2009 Stoddard ............. G06Q 10/107 709/206
2009/0070306 A1 3/2009 Stroe
2009/0089293 A1 4/2009 Garritano
2009/0089664 A1 4/2009 Wagner
2009/0112937 A1 4/2009 Campbell et al.
2009/0112953 A1 4/2009 Barsness
2009/0112990 A1 4/2009 Campbell
2009/0119572 A1 5/2009 Koivunen
2009/0125518 A1 5/2009 Bailor et al.
2009/0129596 A1 5/2009 Chavez
2009/0132907 A1 5/2009 Shao
2009/0164620 A1 6/2009 Ziegler
2009/0187815 A1 7/2009 Becerra, Sr. et al.
2009/0192845 A1 7/2009 Gudipaty et al.
2009/0234837 A1 9/2009 Gladyshev
2009/0249224 A1 10/2009 Davis
2009/0282462 A1 11/2009 Skaria et al.
2009/0307585 A1 12/2009 Tranchant
2009/0313240 A1 12/2009 Gile
2009/0313537 A1 12/2009 Fu et al.
2010/0005398 A1 1/2010 Pratley
2010/0017694 A1 1/2010 Wick
2010/0030578 A1 2/2010 Siddique
2010/0050089 A1 2/2010 Kim
2010/0058366 A1 3/2010 Swildens
2010/0083082 A1 4/2010 Lehrian et al.
2010/0083096 A1 4/2010 Dupuis-Latour
2010/0095198 A1* 4/2010 Bultrowicz ........... G06F 40/169 715/255
2010/0153948 A1 6/2010 Schreiber et al.
2010/0175021 A1 7/2010 Ferrara et al.
2010/0205230 A1 8/2010 Simeonov
2010/0205520 A1 8/2010 Parish
2010/0218099 A1 8/2010 Van Melle
2010/0229086 A1 9/2010 Howell
2010/0235763 A1 9/2010 Massand
2010/0241749 A1 9/2010 Rasmussen et al.
2010/0241968 A1 9/2010 Tarara
2010/0245256 A1 9/2010 Estrada
2010/0251122 A1 9/2010 Lee
2010/0268735 A1 10/2010 Planty et al.
2010/0281076 A1 11/2010 Pan
2010/0309436 A1 12/2010 Allen, Jr.
2010/0313110 A1 12/2010 Claridge et al.
2010/0318894 A1 12/2010 Billharz
2010/0325560 A1* 12/2010 Bryan .................... G06Q 10/00 715/753
2011/0035661 A1 2/2011 Balinsky
2011/0055682 A1 3/2011 Friedrich et al.
2011/0066957 A1* 3/2011 Prats ..................... G06F 40/103 709/204
2011/0074699 A1 3/2011 Marr et al.
2011/0075699 A1 3/2011 Okoren et al.
2011/0078246 A1 3/2011 Dittmer-Roche
2011/0085211 A1 4/2011 King
2011/0099093 A1 4/2011 Mills
2011/0126191 A1 5/2011 Hughes et al.
2011/0164043 A1 7/2011 Arora
2011/0167336 A1 7/2011 Aitken et al.
2011/0178981 A1 7/2011 Bowen et al.
2011/0179427 A1 7/2011 Krishnamoorthy
2011/0193993 A1 8/2011 Yeom et al.
2011/0209052 A1 8/2011 Parker
2011/0219331 A1 9/2011 Deluca
2011/0252299 A1 10/2011 Lloyd
2011/0252335 A1 10/2011 Lloyd
2011/0252339 A1 10/2011 Lemonik
2011/0264712 A1 10/2011 Ylonen
2011/0264997 A1 10/2011 Mukerjee et al.
2011/0276867 A1 11/2011 Machalek
2011/0282933 A1 11/2011 Schmier
2011/0296299 A1 12/2011 Parker
2011/0302288 A1 12/2011 Davis
2011/0307772 A1 12/2011 Lloyd et al.
2011/0307860 A1 12/2011 Park et al.
2011/0321133 A1 12/2011 Grieve
2012/0016964 A1 1/2012 Veen et al.
2012/0023392 A1 1/2012 Cierniak
2012/0072819 A1 3/2012 Lindner et al.
2012/0084704 A1 4/2012 Lee et al.
2012/0117406 A1 5/2012 Eun
2012/0117452 A1 5/2012 Lloyd
2012/0131483 A1 5/2012 Archer
2012/0137203 A1 5/2012 Schodl
2012/0151317 A1 6/2012 Ho et al.
2012/0240027 A1 9/2012 Pereira et al.
2012/0240028 A1 9/2012 Pereira et al.
2012/0260153 A1 10/2012 Bauchot
2012/0297411 A1* 11/2012 Koizuka ............ H04N 21/4788 725/24
2012/0331373 A1 12/2012 Lindner et al.
2013/0246901 A1 9/2013 Massand
2013/0262574 A1 10/2013 Cohen
2014/0082093 A1 3/2014 Savage
2014/0173407 A1 6/2014 Kruglick
2015/0193406 A1 7/2015 Lemonik et al.
2015/0195311 A1 7/2015 Lemonik et al.
2015/0199185 A1 7/2015 Saff et al.
2015/0199222 A1 7/2015 Day-Richter et al.
2015/0199270 A1 7/2015 Day-Richter et al.
2015/0199317 A1 7/2015 Lemonik et al.
2015/0199318 A1 7/2015 Lemonik et al.

FOREIGN PATENT DOCUMENTS

CN 101453705 A 6/2009
CN 101510220 A 8/2009
EP 1909192 A1 4/2008
JP 2008262449 A 10/2008
WO 2007115149 A1 10/2007

OTHER PUBLICATIONS

Wikipedia "Help: Using talk pages", retrieved by Internet Archive Wayback Machine Jul. 1, 2010, http://web.archive.org/web/20100701123005/http://en.wikipedia.org/wiki/Help:Using_talk_pages p. 1-4.

Wikipedia "Signatures", retrieved by Internet Archive Wayback Machine Mar. 2, 2010, http:/web.archive.org/web/20100302130336/http://en.wikipedia.org/wiki/Wikipedia:Sign_your_posts_on_talk_pages, p. 1-4.

Sankaranarayanan J, Samet H, Teitler BE, Lieberman MD, Sperling J. Twitterstand: news in tweets. InProceedings of the 17th acm sigspatial international conference on advances in geographic information systems Nov. 4, 2009 (pp. 42-51).

Meyrowitz N, Van Dam A. Interactive editing systems: Part II. ACM Computing Surveys (CSUR). Sep. 1, 1982;14(3):353-415.

Right Source "How to use Twitter, for Beginners" published Dec. 2, 2010, p. 1-7, retrieved from https://www.rightsourcemarketing.com/social-media/how-to-use-twitter-for--beginners (Year: 2010).

(56) References Cited

OTHER PUBLICATIONS

YoruFukurou (Night Owl) captured on Mar. 16, 2010 and archived on the Wayback Machine, 8 pages, retrieved from https://web.archive.ord/web/20100316054338/htto://sites.google.com:80/site/yorufukurou/home-en (Year 2010).
Berry et al., Role-Based Control of Shared Application Views, ACM 2005, pp. 23-32.
Bibi S., et al., "A Platform for Delivering Multimedia Presentations on Cultural Heritage," 2010 14th Panhellenic Conference on Informatics, pp. 175-179.
Brouwer M., et al., "MathDox Editor," Electronic Proceedings MathUI, 2009, pp. 1-8, XP055028009, [Retrieved on May 23, 2012], Retrieved from URL: http://www.win.tue.nl/ hansc/mde.pdf.
Chengzheng S., "Operational Transformation in Real-Time Group Editors: Issues, Algorithms, and Achievements," Proceedings of ACM Conference on Computer-Supported Cooperative Work, 1988, pp. 1-10.
Chitu A., "Footnotes in GoogleDocs," Google Operating System, Oct. 17, 2008, 1 Page, XP055028085, [Retrieved on May 24, 2012] Retrieved from URL: http://googlesystem.blogspot.com/2008/10/footnotes-in-google-docs.html.
Citro S., "Conflict Management for Real-Time Collaborative Editing in Mobile Replicated Architectures," Australian Computer Society Incorporated, Thirteenth Australian Computer Science Conference (ACSC2007), 2007, 10 Pages.
Connor N., "Zoho 4 Everyone," Safari Books Online, 2008, pp. 1-17, [Retrieved on Aug. 21, 2012] Retrieved from URL: http://techbus.safaribooksonline.com/print?xmlid=9780768687835/ch01lev1sec2.
Co-Pending U.S. Appl. No. 61/381,780, filed Sep. 10, 2010, 22 Pages.
Co-Pending U.S. Appl. No. 61/448,715, filed Mar. 3, 2011, 40 Pages.
Danilatos D., "Demonstration Doodad, with a Few Different Variations of Rendering and Interactive Behaviour," Wave Protocol, Dec. 5, 2010, 3 Pages, XP055028081, [Retrieved on May 24, 2012] Retrieved from URL: http://code.google.com/p/wave-protocol/source/browse/src/org/waveprotocol/wave/client/editor/examples/img/MyDoodad.java.
Danilatos, "Riche Text Editor," Wave Protocol Group Discussion Forum, Message dated on Jun. 10, 2010, 8:57am, 2 Pages, XP055027976, [Retrieved on May 23, 2012] Retrieved from URL: https://groups.google.com/group/wave-protocol/browse_thread/threadl73608bf7a13f2385.
Dejean D., "Online Office Apps Get Real: Google Docs vs. ThinkFree vs. Zoho," Computerworld, Jul. 16, 2008, 22 pages, [Retrieved on Sep. 13, 2019], Retrieved from URL: https://www.computerworld.com/article/2534786/networking/online-office-apps-get-real-google-docs-vs-thinkfree-vs-zoho.html?page=6.
Dejean D., "Online Office Apps Get Real: Google Docs vs. ThinkFree vs. Zoho," Computerworld, Jul. 16, 2008, 7 Pages, [Retrieved on Oct. 15, 2010], Retrieved from URL: http://www.computerworld.com/s/article/9108799/0nline_office_apps_get_real_Google_Docs_vs._ThinkFree_vs._Zoho.
Ellis C.A., et al., "Concurrency Control in Groupware Systems," ACM 1989, pp. 399-407.
Extended European Search Report for European Patent Application No. 19190190.9, mailed Oct. 30, 2019, 9 Pages.
Final Office Action for U.S. Appl. No. 16/272,340, mailed Nov. 8, 2022, 13 Pages.
Galbreath S.C., et al., "Sharpen Your Spreadsheet Skills," Journal of Accountancy, 1998, vol. 186, 8 pages.
Googlepedia: "The Ultimate Google Resource," Third Edition, Safari books Online, 24 Pages, (pp. 276-287 in Original Source).
Greymatter Honeypot: "Comment Email Responder," Mar. 4, 2010, 1-2 Pages, Retrieved from URL: https://web.archive.org/web/20100304221737/ http://www.u-g-h.com/wordpress-plugins/wordpress-plugin-comment-email-responder.
Harmen J., "Guessing Font Availability with Javascript," Nov. 13, 2008, pp. 1-5, XP055015680, Retrieved on [Jan. 4, 2012] Retrieved from URL: http://www.whatstyle.net/articles/54/guessing_font_availability_with_javascript.
Hearnden D., "Wave Editor & Document Rendering," A talk by Dave Hearnden at the Wave Summit Captured in Video on YouTube, Nov. 12, 2010, 15 Pages, [Retrieved on May 23, 2012] Retrieved from URL: http://youtube.be/EuXApEullzc.
Herrick D.R., "Google This Using Google Apps for Collaboration and Productivity," Proceedings of the ACM SIGUCCS Fall Conference on User Services Conference, SIGUCCS '09, Oct. 11-14, 2009, pp. 55-63.
"HTML Living Standard," Jun. 7, 2018, 21 pages, Retrieved on [Nov. 11, 2011], Retrieved from URL: http://www.whatwg.org/specs/web-apps/current-worklmultipage/offline.html.
Huang R., et al., "A General Purpose Virtual Collaboration Room," Google, 1999, pp. 1-9.
International Preliminary Report on Patentability for International Application No. PCT/US2011/001417, mailed Apr. 4, 2013, 7 Pages.
International Preliminary Report on Patentability for International Application No. PCT/US2011/001893, mailed Jun. 27, 2013, 8 Pages.
International Preliminary Report on Patentability for International Application No. PCT/US2012/028102, mailed Oct. 3, 2013, 10 Pages.
International Preliminary Report on Patentability for International Application No. PCT/US2012/051404, mailed Mar. 13, 2014, 08 Pages.
International Preliminary Report on Patentability for International Application No. PCT/US2011/001557, mailed Mar. 21, 2013, 11 Pages.
International Preliminary Report on Patentability for International Application No. PCT/US2012/028279, mailed Oct. 3, 2013, 10 Pages.
International Search Report and Written Opinion for International Application No. PCT/US2011/001417, mailed Nov. 25, 2011, 7 Pages.
International Search Report and Written Opinion for International Application No. PCT/US2011/001557, mailed Jan. 12, 2012, 12 Pages.
International Search Report and Written Opinion for International Application No. PCT/US2011/001893, mailed Jun. 26, 2012, 15 Pages.
International Search Report and Written Opinion for International Application No. PCT/US2012/028102, mailed Jun. 5, 2012, 15 Pages.
International Search Report and Written Opinion for International Application No. PCT/US2012/028279, mailed Jun. 6, 2012, 15 Pages.
International Search Report and Written Opinion for International Application No. PCT/US2012/051404, mailed Nov. 12, 2012, 10 Pages.
Jakobsson M., et al., "Invasive Browser Sniffing and Countermeasures," Proceedings of the 15th International Conference on World Wide Web , WWW '06, New York, New York, USA, Jan. 1, 2006, 10 Pages, doi:10.1145/1135777.1135854, ISBN 978-1-59-593323-2, XP055042978.
Katz, Chapter 7 Working with Multiple Sheets, Google 2000, pp. 239-264.
Kindberg T., "Mushroom: A Framework for Collaboration and Interaction Across the Internet," Google, 1996, pp. 1-11.
Kjaer O.J., "Timing and Synchronization in JavaScript," Dev. Opera, Sections: "The Basics", "Event Queing", "Long Running Scripts" and "Advice on Timing," Feb. 27, 2007, 13 pages, Retrieved from URL: http://dev.opera.com/articles/view/timing-and-synchronization-in-javascript.
Krieger S., "Documents, Presentations, and Workbooks: Using Microsoft Office to Create Content that Gets Noticed," published May 4, 2011, pp. 1-104.

(56) References Cited

OTHER PUBLICATIONS

Laura Q.S., "Comparing Online vs. Traditional Office Software," May 21, 2010, pp. 1-5, Oct. 15, 2010, Retrieved on [Jun. 7, 2018] Retrieved from URL: http://www.techsoup.org/learningcenter/software/page11852.cfm.

Louie M., "New Themes in Google forms," Google, May 19, 2010, 2 Pages.

McCue, Acrobat Production Tips. Real World Print Production with Adobe Creative Suite Applications, copyright 2009, Chapter 12, pp. 1-40.

Microsofttm Office: MAC: "Simultaneously Edit A Presentation with other Authors," Published Nov. 11, 2010, pp. 1-4.

Mulvany N.C., "What's Going On In Indexing," ACM, 1997, pp. 10-15.

Munteaunu C., et al., "Collaborative Editing for Improved Usefulness and Usability of Transcript-Enhanced Webcasts," ACM, Apr. 5-10, 2008, pp. 373-382.

Nichols D.A., et al., "High-Latency, Low-Bandwidth Windowing in the Jupiter Collaboration System," UIST '95. 8th Annual Symposium on User Interface Software and Technology, Proceedings of the ACM Symposium on User Interface Software and Technology, Nov. 14-17, 1995, pp. 111-120.

Notice of Allowance for U.S. Appl. No. 16/272,340, mailed Jan. 25, 2023, 5 Pages.

Pacull F., et al., "Duplex: A Distributed Collaborative Editing Environment in Large Scale," ACM, Oct. 1994, pp. 165-173.

Peels A.J.H.M., et al., "Document Architecture and Text Formatting," ACM Transactions on Office Information Systems, Oct. 1, 1985, pp. 347-369.

Pereira, Luiz, et al., "Merging Electronic Document Redraws", U.S. Appl. No. 13/006,259, filed Jan. 13, 2011.

Raggett D., "Slidy—A Web Based Alternative to Microsoft PowerPoint," Published on 2006, 13 pages.

Raph L., et al., "Introducing the Google Font API & Google Font Directory," Google Font API Team, May 19, 2010, 3 Pages.

Rowse D., "5 Comment Management Plugins for WordPress," Problogger, Aug. 21, 2007, 19 Pages, Retrieved from URL: https://problogger.com/5-comment-management-plugins-for-wordpress.

Taylor A.D., "Cool Apple Keynote Presentation Tricks And Tips," Published Apr. 2011, pp. 1-5.

Tyson H., "Microsoft Word 2007 Bible," 2007, 112-115, 467, 523-525, 798, 11 pages.

Wang D., et al., "Google Wave Operational Transformation," Jul. 1, 2010, pp. 1-7, [Retrieved on Feb. 14, 2012] Retrieved from URL: http://wave-protocol.googlecode.com/hg/whitepapers/operational-transform/operational-transform.html.

Wikipedia: "Model-View-Controller—Wikipedia, the free encyclopedia," Nov. 15, 2010, 4 Pages, Retrieved from URL: https://en.wikipedia.org/wiki/Model%E2%80%93view%E2%80%93controller.

Wordpress: "User Levels," WordPress, Jul. 1, 2005, 2 pages, [Retrieved on Jul. 1, 2005] Retrieved from URL: http://codex.wordpress.org/User_Levels.

Xu W., et al., "Using Spreadsheet Software as a Platform for Power System Analysis," IEEE Computer Applications in Power, Jan. 1999, pp. 41-45.

"Chapter 6. Viewing and Printing Worksheets," Excel: The Missing Manual, O'Reilly, U.S., Dec. 1, 2004 pp. 1-7 section 6.1.3.

"Moving Split Bar in a Customized Details View" IBM Technical Disclosure Bulletin, International Business Machines Corp. (Thornwood), U.S., Dec. 1, 1991, vol. 34, No. 7A, pp. 426-428.

* cited by examiner

160

User Device

210

Browser

270

Display

DOCUMENT PROCESSING SERVICE FOR DISPLAYING COMMENTS INCLUDED IN MESSAGES

RELATED APPLICATIONS

This application is a continuation of U.S. patent application Ser. No. 16/272,340, filed on Feb. 11, 2019, which is a continuation of U.S. patent application Ser. No. 14/673,809 filed on Mar. 30, 2015, now issued as U.S. Pat. No. 10,204,086, which is a continuation of U.S. patent application Ser. No. 13/249,442, filed Sep. 30, 2011, which is now issued as U.S. Pat. No. 8,996,985 which claims the benefit of provisional Patent Application No. 61/453,238, filed Mar. 16, 2011, The entire content of each are hereby incorporated by reference herein.

TECHNICAL FIELD

This specification relates generally to systems and methods for processing documents, and more particularly to systems and methods for providing online document processing services.

BACKGROUND

Online document processing services allow users to create and manipulate documents via the Internet, and store the documents at a remote location. Typically, a user accesses an online document processing service using a web browser operating on a computer or other device. Many existing document management services offer common word processing functions, including text editing, text searching, etc. By storing a document at the remote location, a user can access the document from any location, using a computer or other user device that has access to the Internet. Some online document processing services allow multiple users to access a document and to collaborate in creating and editing the document.

SUMMARY OF THE INVENTION

In accordance with an embodiment, a method for providing online document processing services is provided. A plurality of comments associated with a document is received, and a representation of the document and a representation of a comment thread comprising the plurality of comments are displayed simultaneously on a user device. In one embodiment, a first comment is received from a first user and a second comment is received from a second user. The comment thread may be stored.

In one embodiment, at least one of the plurality of comments pertains to a change to the document. The document is updated based on the change, and a representation of the updated document and a representation of the comment thread comprising the plurality of comments are displayed simultaneously on the user device.

In another embodiment, a comment associated with the document is received from a first user. It is determined that the comment includes an address associated with a second user, and, in response to determining that the comment comprises the address associated with the second user, a message is transmitted to the address. The address may comprise an email address. The message may comprise a link to a page comprising a representation of the document and a representation of the comment thread.

In another embodiment, a selection of a resolve option is received from a user. In response to the selection of the resolve option, the representation of the comment thread is removed from a display on a user device.

These and other advantages of the present disclosure will be apparent to those of ordinary skill in the art by reference to the following Detailed Description and the accompanying drawings.

DETAILED DESCRIPTION

Figures 1, 2:
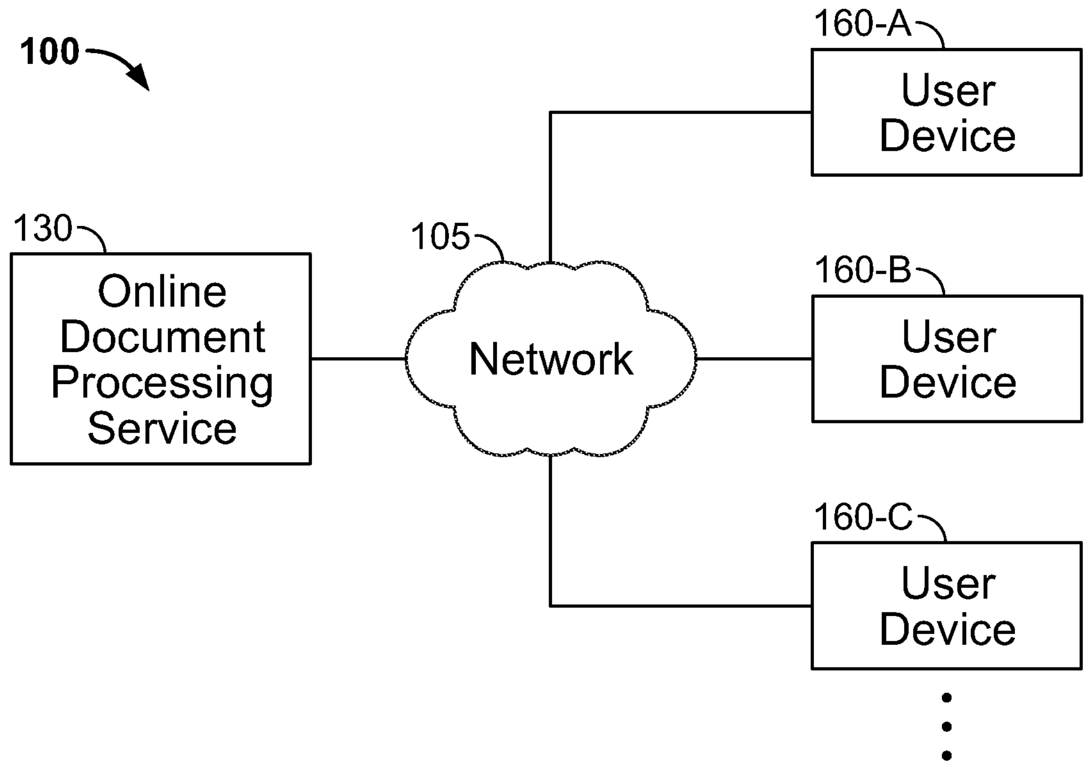
FIG. 1 shows a communication system that may be used to provide document processing services in accordance with an embodiment.
FIG. 2 shows functional components of an exemplary user device.

FIG. 1 shows a communication system 100 that may be used to provide document processing services in accordance with an embodiment. Communication system 100 comprises a network 105, an online document processing service 130, and user devices 160-A, 160-B, 160-C, etc. For convenience, the term "user device 160" is used herein to refer to any one of user devices 160-A, 160-B, 160-C, etc. Accordingly, any discussion herein referring to "user device 160," or to a component of a user device, is equally applicable to each of user devices 160-A, 160-B, 160-C, etc. Communication system 100 may comprise more or fewer than two user devices.

In the exemplary embodiment of FIG. 1, network 105 is the Internet. In other embodiments, network 105 may comprise one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may comprise a combination of different types of networks.

Online document processing service 130 provides document processing services to users via network 105, enabling users to create, display, and edit documents remotely. For example, online document processing service 130 may provide online word processing services, allowing users to create, store, and edit text documents and other types of documents. Online document processing service 130 may be accessible via a World Wide Web page that may be viewed using a conventional Web browser, for example. A user may be required to log into a respective user account to access his or her document(s). Online document processing service 130 may offer common word processing features such as text editing, text searching, table creation and editing, etc. Online document processing service 130 may also provide other functions such as image creation and editing, spreadsheet management, etc. Online document processing service 130 may grant to a user access rights with respect to a document, such as viewing and editing rights.

User device 160 may be any device that enables a user to communicate via network 105. User device 160 may be connected to network 105 through a direct (wired) link, or wirelessly. User device 160 may have a display screen (not shown) for displaying information. For example, user device 160 may be a personal computer, a laptop computer, a workstation, a mainframe computer, etc. Alternatively, user device 160 may be a mobile communication device such as a wireless phone, a personal digital assistant, etc. Other devices may be used.

FIG. 2 shows functional components of an exemplary user device 160 in accordance with an embodiment. User device 160 comprises a web browser 210 and a display 270. Web browser 210 may be a conventional web browser used to access World Wide Web sites via the Internet, for example. Display 270 displays documents, images, Web pages, and other information to a user. For example, a text document that a user creates or edits may be displayed on display 270.

Figure 3:
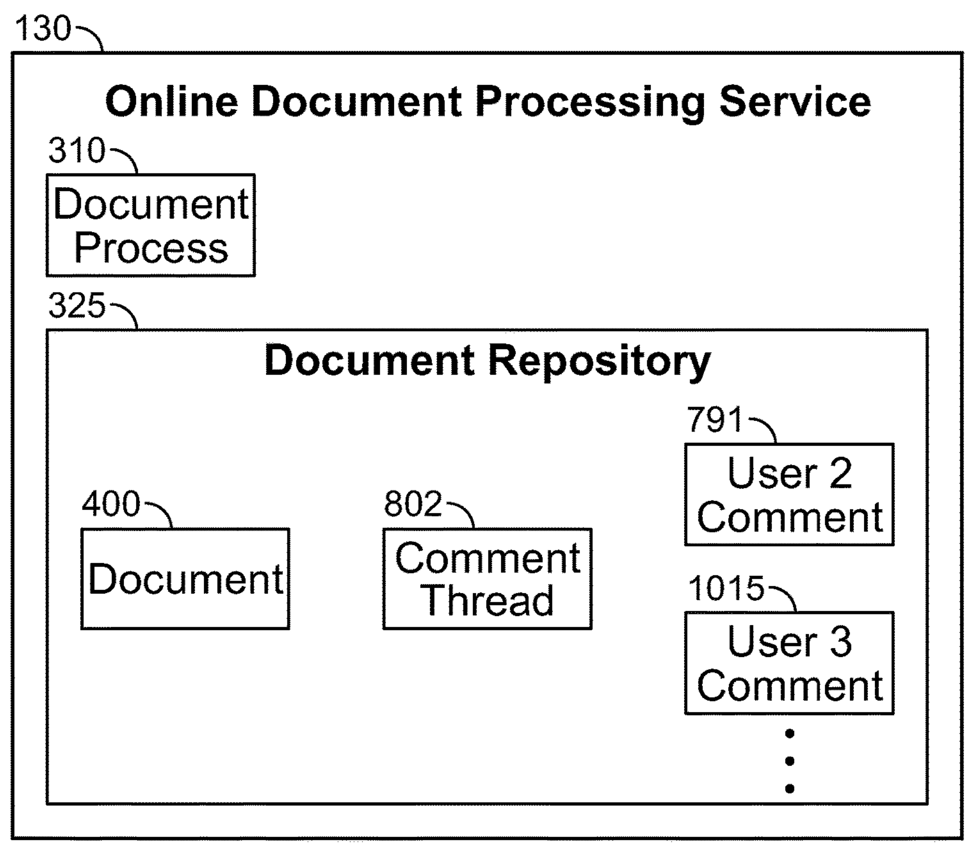
FIG. 3 shows functional components of an online document processing service in accordance with an embodiment.

FIG. 3 shows functional components of online document processing service 130 in accordance with an embodiment. Online document processing service 130 comprises a document process 310 and a document repository 325. Document process 310 manages documents and performs operations requested by users, such as creating documents, editing text, performing text searches, etc. Documents created by users are stored in document repository 325. A document created by a user may be stored in association with his or her user account, for example. Multiple versions of a user's document may be stored in document repository 325. Document process 310 also provides comment and discussion functions allowing users to generate comments relating to documents, and to participate in discussions relating to documents. Information relating to comments and discussions may be stored in document repository 325.

In accordance with the embodiment of FIG. 1, a user may access online document processing service 130 and create and/or edit a document. For example, a user may employ browser 210 to access a World Wide Web site maintained by online document processing service 130. In a well-known manner, the user may be required to log into a user account to access his or her documents. The user may be required to authenticate his or her identity, e.g., by entering a user name and password, before accessing his or her user account and documents associated with the account. Online document processing service 130 may verify the user's access rights with respect to a document before granting the user access to the document.

Figure 4:
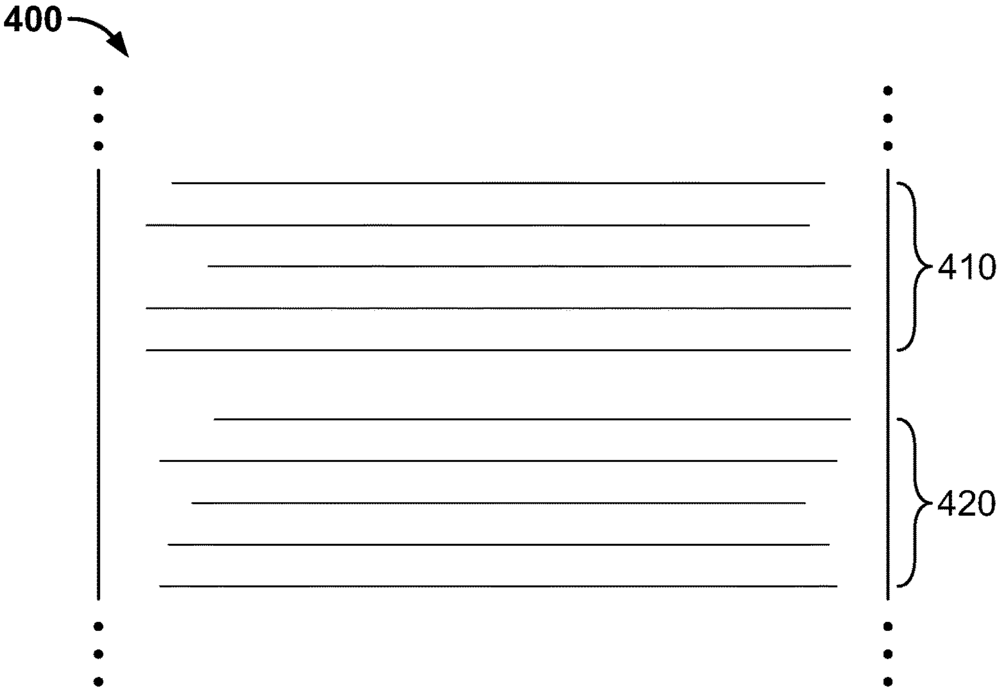
FIG. 4 shows a document in accordance with an embodiment.

Suppose, for example, that a first user, employing user device 160-A, accesses online document processing service 130 and creates a new document, such as document 400 illustrated in FIG. 4. In the illustrative embodiment, document 400 comprises text, including paragraphs 410 and 420. In various embodiments, a document may comprise lines of text, images, tables, headers, footers, footnotes, etc. Online document processing service 130 stores document 400, or data representing document 400, in document repository 325, as shown in FIG. 3. Online document processing service 130 may store a document model representing document 400, for example. The user may subsequently employ user device 160-A, or another device, to access document 400 via the Internet.

Figure 5:
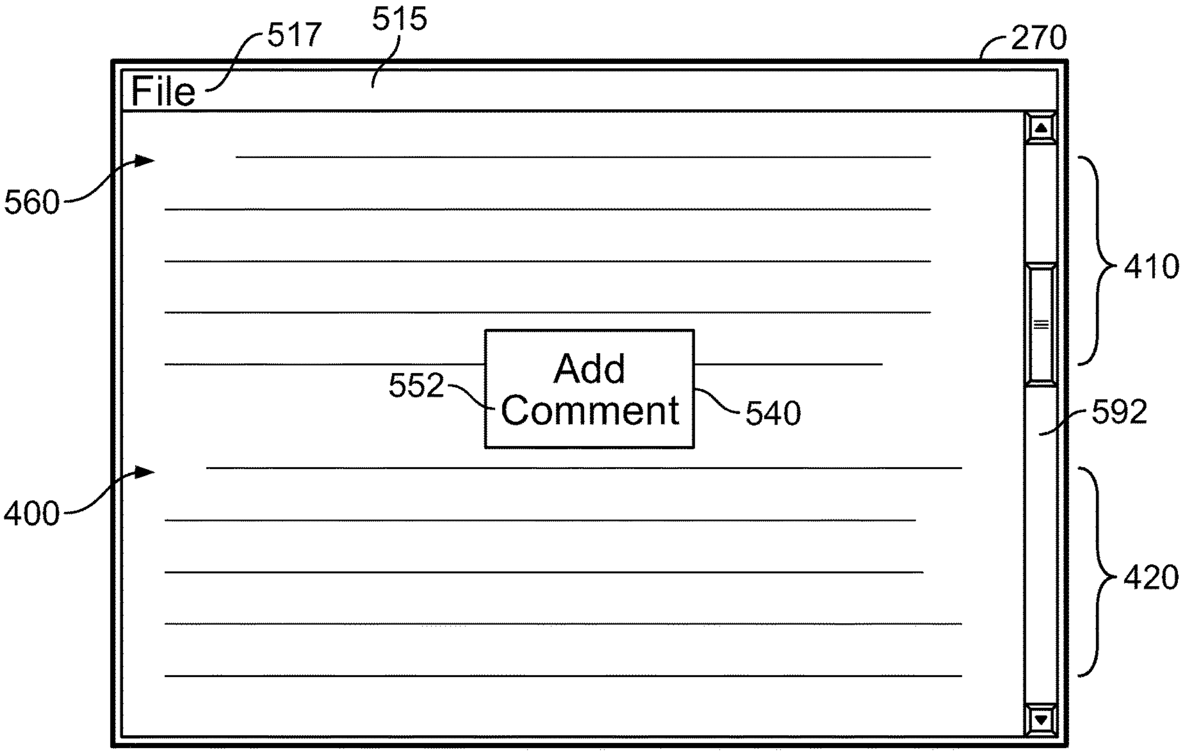
FIG. 5 shows a web page displaying a document in accordance with an embodiment.

A well-known technique used by online document processing services to display a document on a user device includes transmitting data adapted to cause the user device to display all or a portion of the document on a Web page. For example, online document processing service 130 may transmit to browser 210 a request, in the form of HyperText Markup Language (HTML), adapted to cause browser 210 to display a representation of document 400. In response, browser 210 displays a representation of all or a portion of document 400. Suppose, for example, that after the first user creates document 400, a second user employs user device 160-B and accesses online document processing service 130 in order to view document 400. Online document processing service 130 transmits to user device 160-B data adapted to cause the user device to display a portion of document 400 on display 270, as shown in FIG. 5. In this illustrative embodiment, a page 560, including paragraphs 410 and 420, is displayed. Browser 210 also displays a tool bar 515 including various options, such as File option 517, and a scroll bar 592 that allows a user to scroll up or down within document 400.

Figure 6:
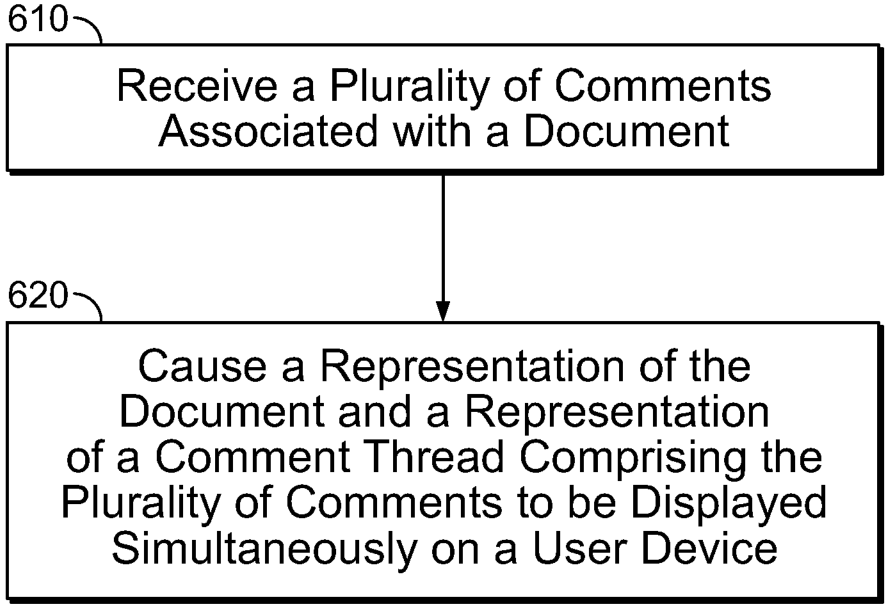
FIG. 6 is a flowchart of a method for providing document processing services in accordance with an embodiment.

In accordance with an embodiment, multiple comments relating to a particular document, received from one user or from multiple users, may be displayed simultaneously with the document on the display of a user device. FIG. 6 is a flowchart of a method for providing online document services in accordance with an embodiment. At step 610, a plurality of comments associated with a document is received. At step 620, a representation of the document and a representation of a comment thread comprising the plurality of comments is caused to be displayed simultaneously on a user device.

Figure 7A:
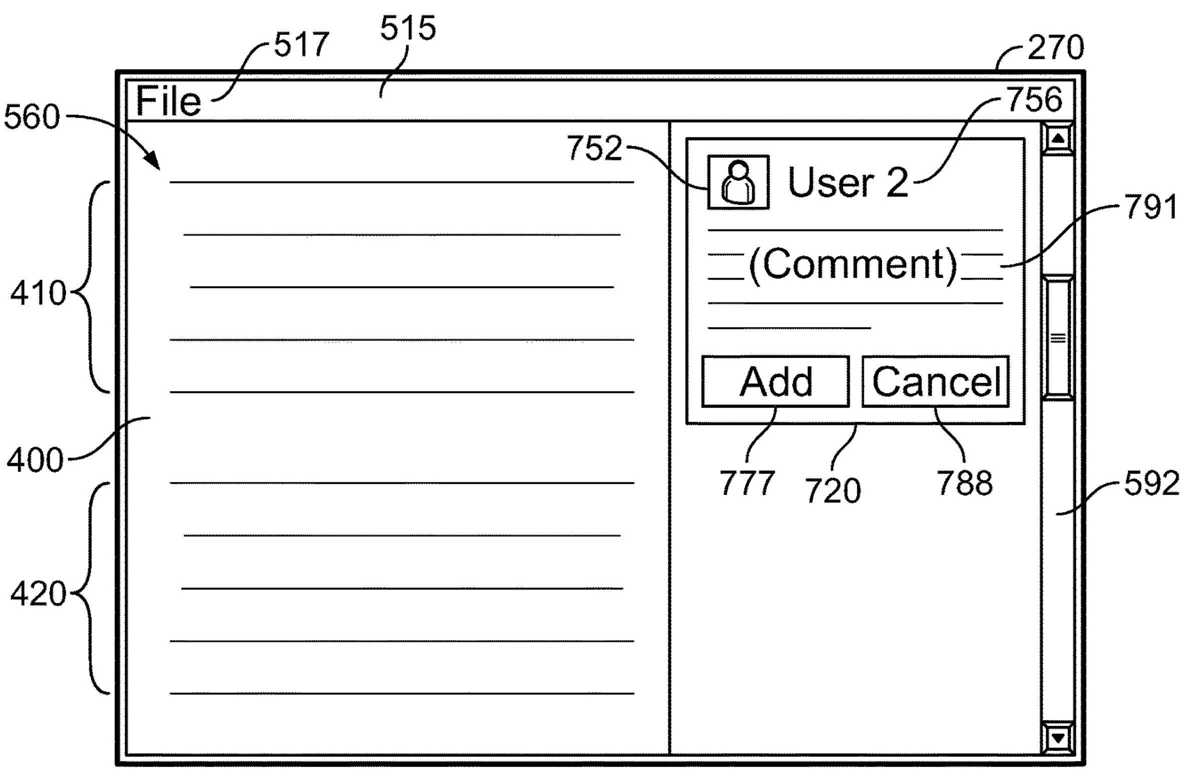
FIG. 7A shows a web page displaying a document in accordance with an embodiment.

Suppose, for example, that while viewing document 400, the second user wishes to add a comment relating to paragraph 410. In an embodiment, the second user may select an option to add a comment. Referring to FIG. 5, for example, the second user may right-click on a computer mouse to cause a menu of options to appear on display 270. In response, online document processing service 130 causes browser 210 to display a menu 540 including an "Add Comment" option 552. When the second user selects Add Comment option 552, browser 210 transmits the selection to online document processing service 130. In response, online document processing service causes browser 210 to display a region in which the user may compose a comment. Referring to FIG. 7A, browser 210 may display page 560, including paragraphs 410 and 420, in a left-hand portion of display 270, and display, in a right-hand portion of the display, a comment box 720 in which the second user may compose a comment. Comment box 720 comprises an image 752 or other representation of the second user, and an indication 756 of the second user's name, nickname, username, title, etc.

Figure 7B:
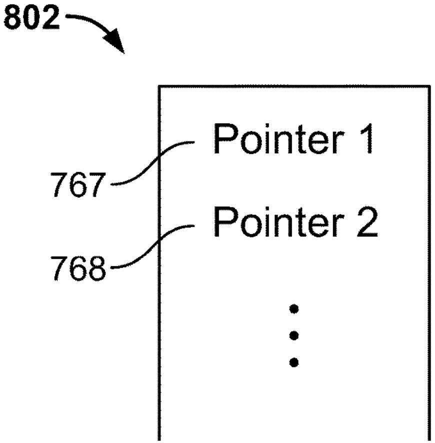
FIG. 7B illustrates a comment thread in accordance with an embodiment.

After the second user composes a comment within comment box 720, the second user may either post the comment, by selecting an add option 777, or may choose to cancel the comment, by selecting a cancel option 788. In the illustrative embodiment, the second user selects add option 777. Browser 210 transmits the selection, and the second user's comment, to online document processing service 130. In response, online document processing service 130 stores the second user's comment in document repository 325, as comment 791, as shown in FIG. 3. In the embodiment of FIG. 3, online document processing service 130 defines a comment thread 802 associated with document 400, and stores comment 791 in association with comment thread 802. As used herein, the term "thread" means a data structure comprising information relating to one or more associated comments. In one example, various related comments in a thread may be stored at various memory locations within document repository 325, and the comment thread may comprise pointers to the various comments. FIG. 7B illustrates comment thread 802 in accordance with an embodiment. Comment thread 802 comprises a pointer 767 associated with comment 791, for example. A comment thread may comprise other types of information. Other data structures, such as a database, may be used to define and/or store a comment thread.

Online document processing service 130 transmits to user device 160-B, and to other user devices, data adapted to cause the user device to display simultaneously a representation of document 400 and a representation of comment thread 802. In response, browser 210 may display, on display 270, a page such as that shown in FIG. 8. Page 560 of document 400, including paragraphs 410 and 420, is displayed in a left-hand portion of display 270. Comment thread 802, including the second user's comment 791, is displayed simultaneously in a right-hand portion of display 270.

Figure 8:
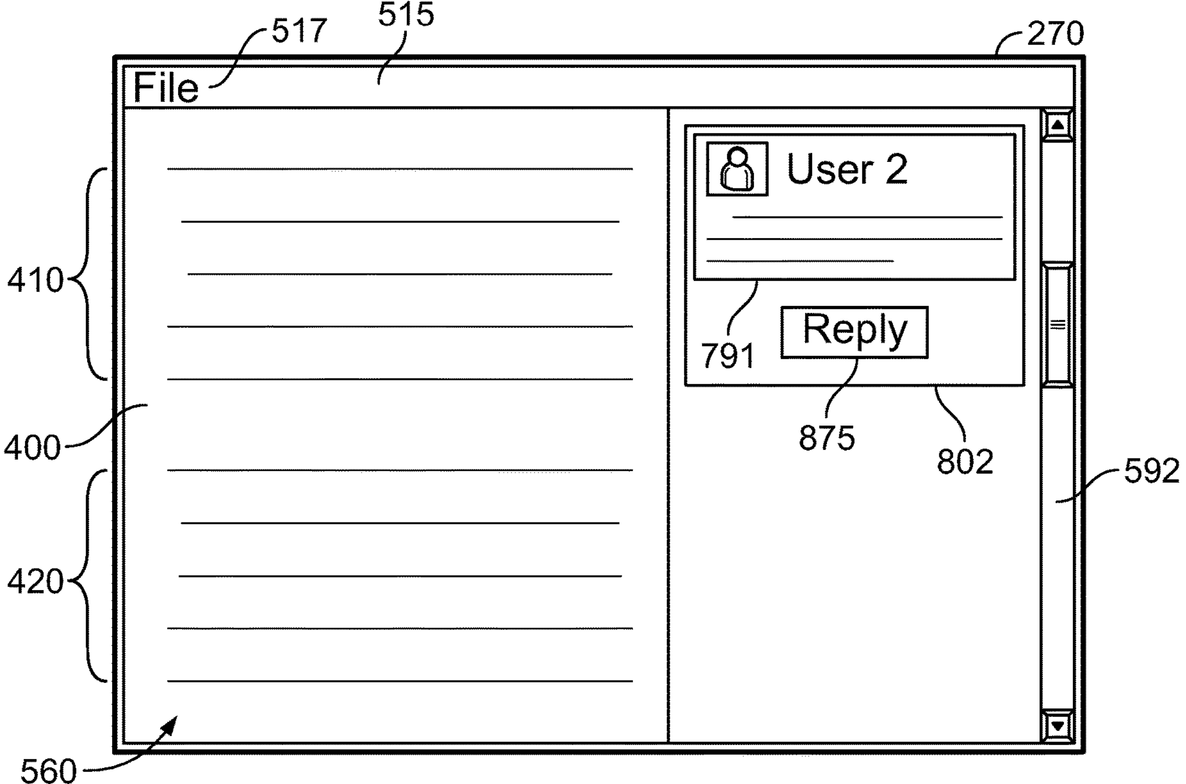
FIG. 8 shows a web page displaying a document in accordance with an embodiment.

As indicated in FIG. 8, a reply option 875 is displayed in association with comment thread 802. Reply option 875 allows a user to reply to comment 791 or otherwise to add an additional comment to comment thread 802.

Figure 9:
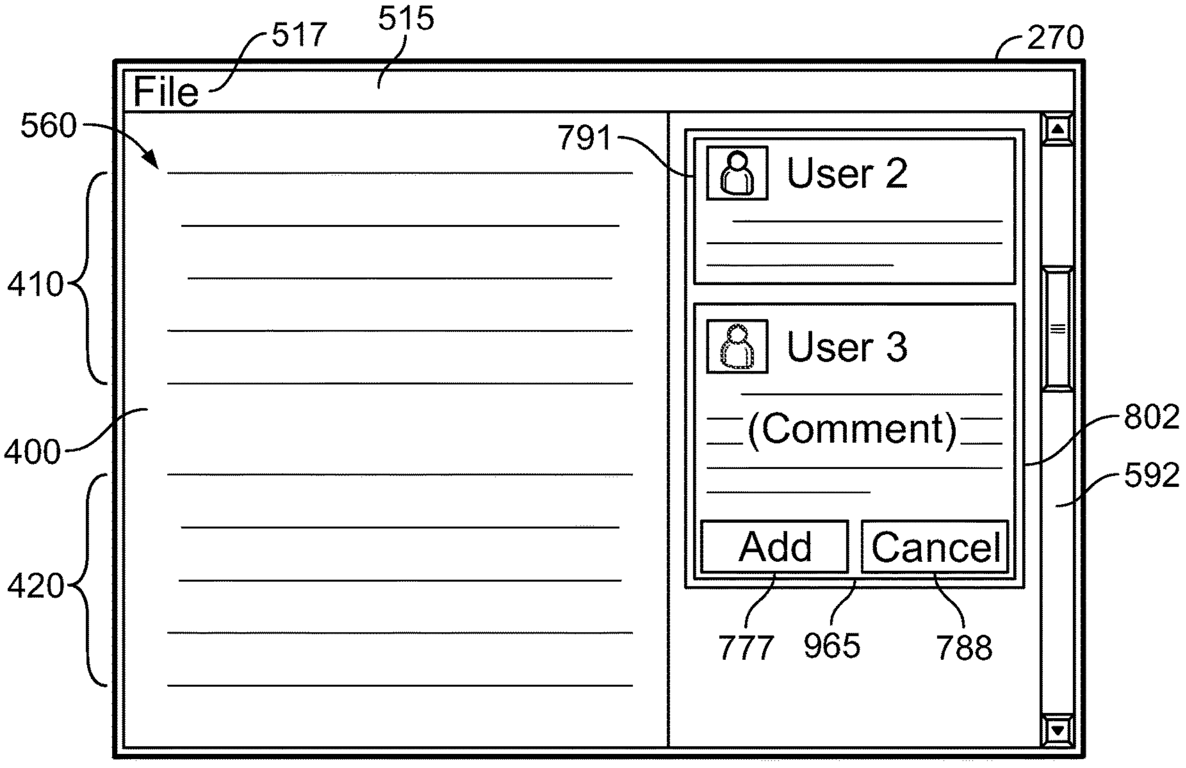
FIG. 9 shows a web page displaying a document in accordance with an embodiment.

After the second user's comment 791 is received and posted, as discussed above, additional comments may be received from other users. Suppose, for example, that a third user, employing user device 160-C (shown in FIG. 1), views document 400, and comment 791, and wishes to add a comment in reply to comment 791. The third user may select reply option 875, using a computer mouse, for example. Browser 210 transmits the selection of reply option 875 to online document processing service 130. In response, online document processing service 130 transmits to user device 160-C data adapted to cause the user device to display a comment box allowing the third user to compose a comment. For example, online document processing service 130 may transmit a request that browser 210 display document 400 and comment thread 802 simultaneously, and that browser 210 include an additional comment box in association with comment thread 802. In response, browser 210 may display, on display 270 of user device 160-C, a web page such as that shown in FIG. 9. Page 560 of document 400, including paragraphs 410 and 420, is displayed in a left-hand portion of display 270. Comment thread 802, including the second user's comment 791, is simultaneously displayed in a right-hand portion of display 270. In the illustrative embodiment, a comment box 965 is displayed in which the third user may compose a reply comment.

In the illustrative embodiment, the third user composes a reply comment and selects add option 777. User device 160-C transmits the third user's selection, and the third user's comment, to online document processing service 130. Online document processing service 130 stores the third user's comment in document repository 325, as comment 1015, as shown in FIG. 3. Online document processing service 130 also updates comment thread 802 to include a pointer 768 (and/or other information) associated with the third user's comment 1015, as shown in FIG. 7B. Online document processing service 130 may then transmit to user device 160-C (and to other user devices) a request to display simultaneously document 400 and updated comment thread 802. In response, browser 210 displays, on display 270, a page such as that shown in FIG. 10. Page 560 of document 400, including paragraphs 410 and 420, is displayed in a left-hand portion of display 270. Comment thread 802, including the second user's comment 791 and the third user's comment 1015, are displayed within comment thread 802 in the right-hand portion of display 270.

Enabling users to maintain comment threads associated with a document, and displaying the comment threads simultaneously with the document, as described herein, provides particular advantages in the context of document production and management. Allowing users to view comments in real-time along with the document improves communication among users, provides a more efficient workflow and accelerates document production.

Figure 10:
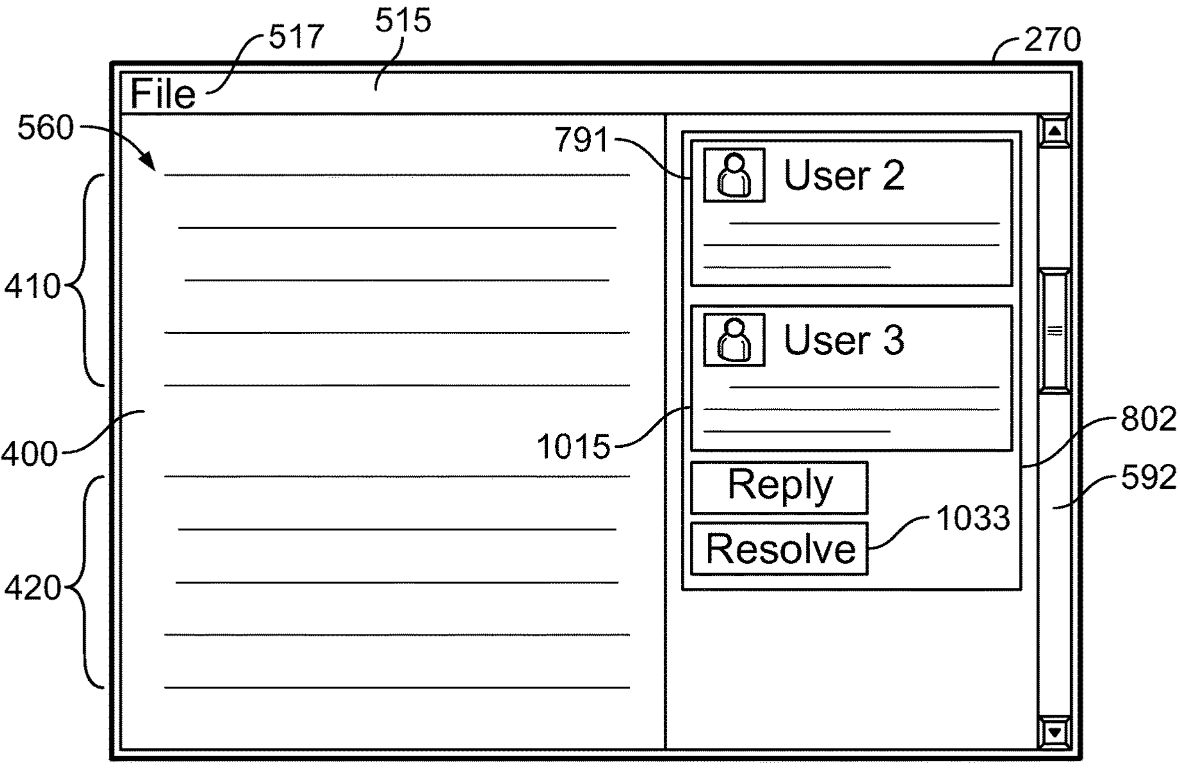
FIG. 10 shows a web page displaying a document in accordance with an embodiment.

Referring to FIG. 10, a resolve option 1033 is also displayed in association with comment thread 802. In accordance with an embodiment, when a user selects the resolve option, comment thread 802 is removed from the display on each user's device, and is no longer displayed in association with document 400. However, comment thread 802, and the associated comments, remain stored in repository 325 and may be re-opened by a user at a later time. For example, if a particular user selects resolve option 1033, document processing service 130 may transmit a resolve notification message to one or more users associated with document 400 indicating that a user has selected the resolve option. For example, a resolve notification message may be transmitted to all users associated with the comment thread. Upon receipt of a resolve notification message, a user device 160 may display a message such as message 1122 shown in FIG. 11. In this example, notification message 1122 states that "A user has resolved this comment thread."

Figure 11:
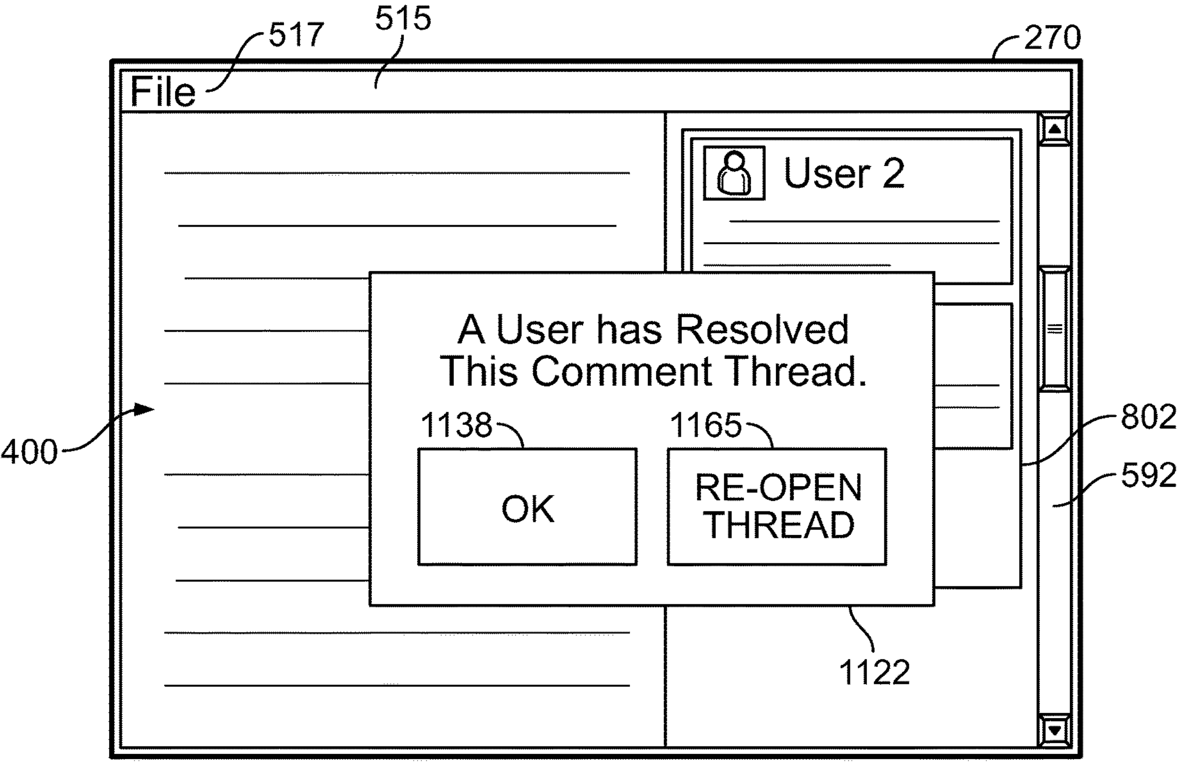
FIG. 11 shows a web page displaying a document in accordance with an embodiment.

Each recipient of the resolve notification message is provided an option to object to the resolution of the comment thread. Referring to FIG. 11, for example, notification message 1122 includes an "OK" option 1138 which a user may select if he or she agrees with the resolution of the comment thread, and a "Re-Open Thread" option 1165, which the user may select if the user does not want the thread to be resolved. If a user selects Re-Open option 1165, comment thread 802 is re-opened and continues to appear on display 270 in association with document 400.

Figure 12:
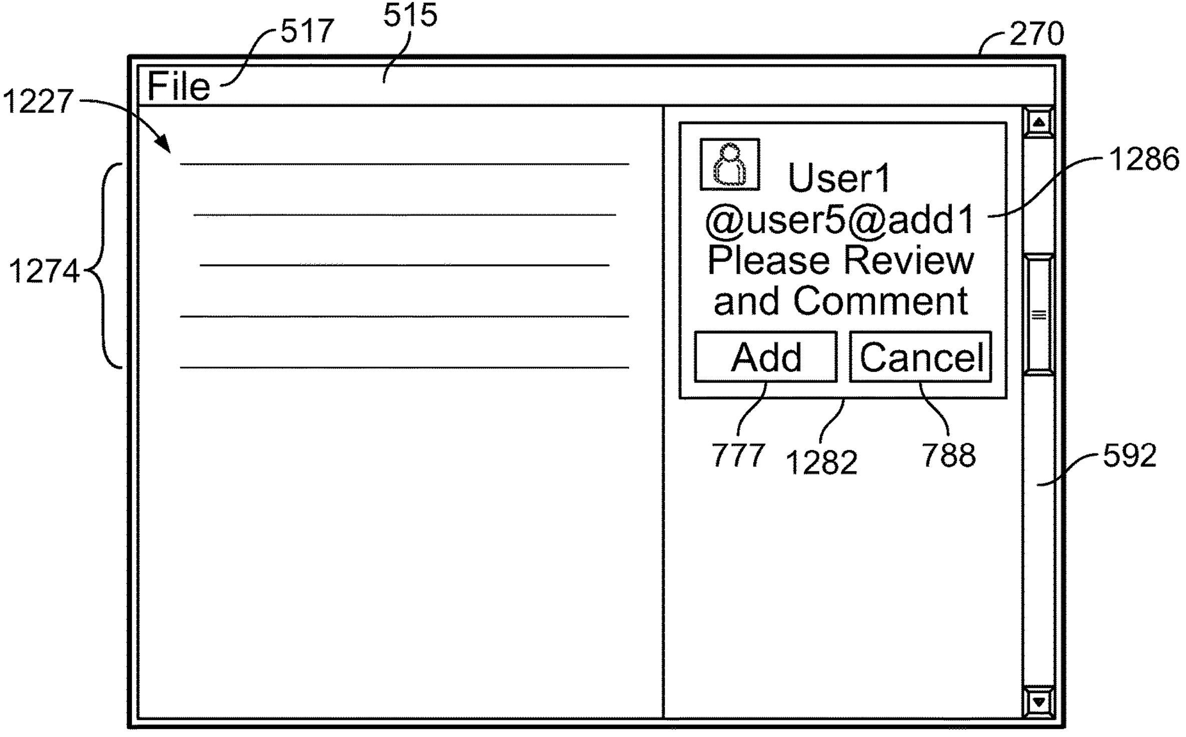
FIG. 12 shows a web page displaying a document in accordance with an embodiment.

In accordance with another embodiment, a first user may include in a comment an address associated with a second user. The inclusion of the second user's address in the comment causes a message to be generated and sent to the second user. Referring to FIG. 12, suppose that the first user reviewing a page 1227 of a document selects a comment option (in the manner described above) to add a comment associated with a particular paragraph 1274. In response, document processing service 130 displays a comment box 1282.

Figure 13:
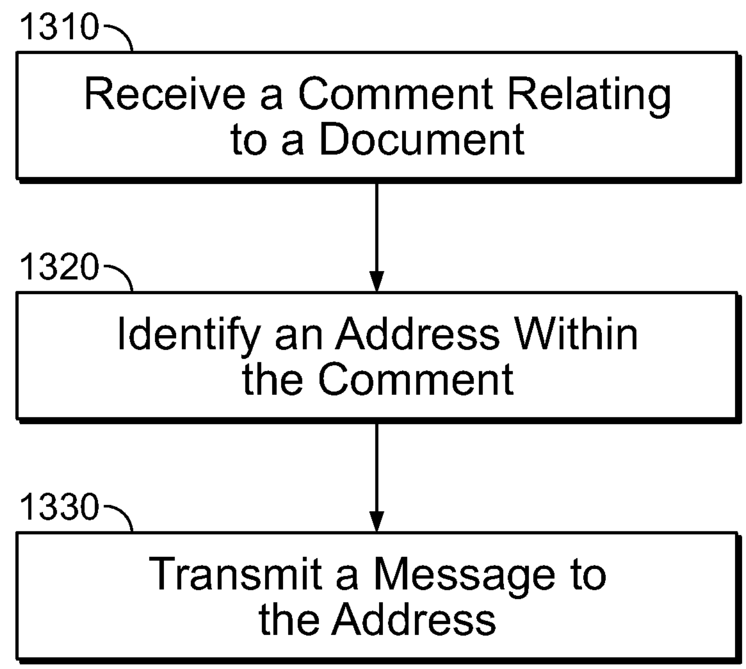
FIG. 13 is a flowchart of a method of providing online document processing services in accordance with an embodiment.

FIG. 13 is a flowchart of a method of providing electronic messaging services in accordance with an embodiment. In the illustrative embodiment of FIG. 12, a first user composes a comment in box 1282, and includes in the comment an email address 1286 associated with another user, "User5." In the illustrative example of FIG. 12, the first user types "@user5@add1," which includes a selected symbol"@" followed by a string of alphanumeric characters representing an email address of User5. It is to be understood that the alphanumeric characters used above to represent an email address are representative only, and that other characters, symbols, and formats may be used.

In one embodiment, when a comment box is displayed and a user is composing a comment, the alphanumeric characters typed by the user within the comment box are monitored, and when the"@" symbol is detected, a list of addresses associated with the document is displayed to the user. For example, a list of email addresses of other users associated with the document may be displayed. The user may select one of the displayed addresses for inclusion in the comment.

At step 1310, a comment relating to a document is received from a first user. When the first user indicates that the comment is complete, by selecting add option 777, for example, document processing service 130 receives the comment from user device 160, establishes a comment thread, if necessary, and adds the comment to the comment thread, in the manner described above.

At step 1320, an address is identified within the comment. Accordingly, document processing service 130 examines the first user's comment and determines that the first user's comment includes the email address "user5@ add1," associated with User5. At step 1330, a message is transmitted to the address. Document processing service 130 generates an email message and transmits the message to the email address "user5@add1." The email message may notify User5 that a comment has been posted that includes the email address associated with User5, for example. The email message may also include a copy of the first user's comment. The message may include other information. For example, the email message may include a link that enables the recipient of the message to click on the link and post a reply to the first user's comment. Clicking on the link may cause the recipient's user device to connect to document processing service 130, access the document, and display the first user's comment and a relevant portion of the document, for example. While in the illustrative embodiment an email address is included in a comment, in other embodiments, other types of addresses may be used.

In various embodiments, the method steps described herein, including the method steps described in FIGS. 6 and/or 13, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 6 and/or 13. Certain steps of the methods described herein, including one or more of the steps of FIGS. 6 and/or 13, may be performed by a server or by another processor in a network-based cloud-computing system. Certain steps of the methods described herein, including one or more of the steps of FIGS. 6 and/or 13, may be performed by a client computer in a network-based cloud computing system. The steps of the methods described herein, including one or more of the steps of FIGS. 6 and/or 13, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 6 and/or 13, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 14:
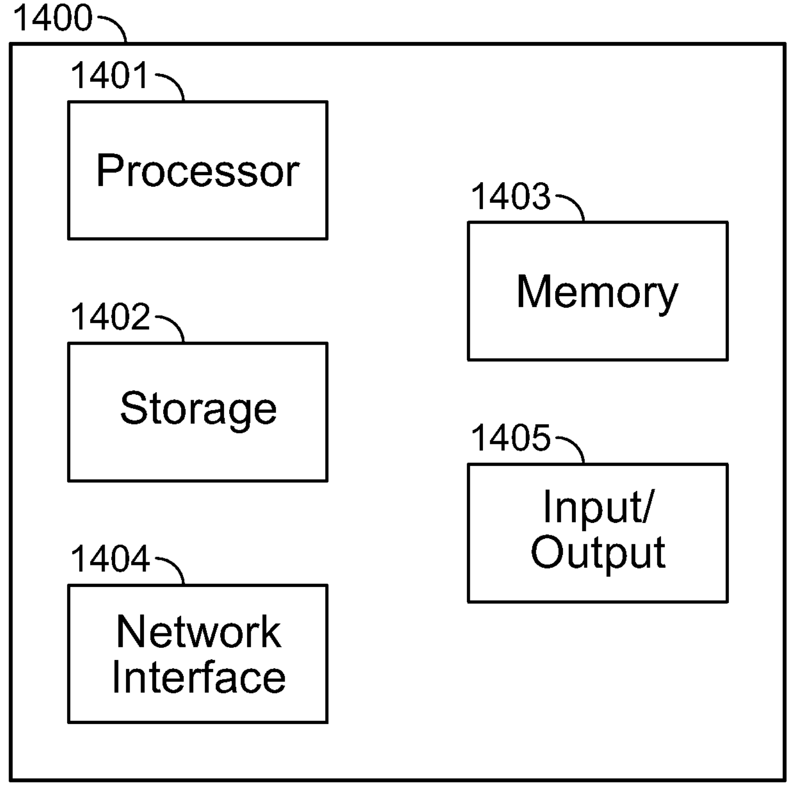
FIG. 14 shows components of a computer that may be used to implement the invention.

A high-level block diagram of an exemplary computer that may be used to implement systems, apparatus and methods described herein is illustrated in FIG. 14. Computer 1400 comprises a processor 1401 operatively coupled to a data storage device 1402 and a memory 1403. Processor 1401 controls the overall operation of computer 1400 by executing computer program instructions that define such operations. The computer program instructions may be stored in data storage device 1402, or other computer readable medium, and loaded into memory 1403 when execution of the computer program instructions is desired. Thus, the method steps of FIGS. 6 and/or 13 can be defined by the computer program instructions stored in memory 1403 and/or data storage device 1402 and controlled by the processor 1401 executing the computer program instructions. For example, the computer program instructions can be implemented as computer executable code programmed by one skilled in the art to perform an algorithm defined by the method steps of FIGS. 6 and/or 13. Accordingly, by executing the computer program instructions, the processor 1401 executes an algorithm defined by the method steps of FIGS. 6 and/or 13. Computer 1400 also includes one or more network interfaces 1404 for communicating with other devices via a network. Computer 1400 also includes one or more input/output devices 1405 that enable user interaction with computer 1400 (e.g., display, keyboard, mouse, speakers, buttons, etc.).

Processor 1401 may include both general and special purpose microprocessors, and may be the sole processor or one of multiple processors of computer 1400. Processor 1401 may comprise one or more central processing units (CPUs), for example. Processor 1401, data storage device 1402, and/or memory 1403 may include, be supplemented by, or incorporated in, one or more application-specific integrated circuits (ASICs) and/or one or more field programmable gate arrays (FPGAs).

Data storage device 1402 and memory 1403 each comprise a tangible non-transitory computer readable storage medium. Data storage device 1402, and memory 1403, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVDROM) disks, or other non-volatile solid state storage devices.

Input/output devices 1405 may include peripherals, such as a printer, scanner, display screen, etc. For example, input/output devices 1405 may include a display device such as a cathode ray tube (CRT) or liquid crystal display (LCD) monitor for displaying information to the user, a keyboard, and a pointing device such as a mouse or a trackball by which the user can provide input to computer 1400.

Any or all of the systems and apparatus discussed herein, including online document processing service 130, user device 160, and components thereof, including web browser 210, display 270, document process 310, and document repository 325, may be implemented using a computer such as computer 1400.

One skilled in the art will recognize that an implementation of an actual computer or computer system may have other structures and may contain other components as well, and that FIG. 14 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:

receiving, from a first client device associated with a first user, content of a first comment corresponding to an electronic document stored in a repository associated with an online document service and accessible by a plurality of user accounts for collaborative editing, the content of the first comment comprising i) a particular symbol followed by one or more characters that represent a second user and ii) a textual message corresponding to a first user's comment;

receiving, from the first client device, an indication that the first comment has been completed;

responsive to receiving, from the first client device, the indication that the first comment has been completed, analyzing, by a server of the online document service, the content of the completed first comment corresponding to the electronic document to determine one or more user electronic mail (email) addresses; and responsive to analyzing the content of the completed first comment, automatically sending a notification indicating the completed first comment has been received exclusively to the one or more user email addresses determined from analyzing the particular symbol followed by the one or more characters from within the content of the completed first comment rather than to all users associated with the electronic document hosted by the online document service, the notification to display a same content of the textual message corresponding to the first user's comment.

2. The method of claim 1, wherein analyzing the content of the completed first comment corresponding to the electronic document to determine the one or more user email addresses, comprises:

detecting the particular symbol in the content of the completed first comment; and identifying the one or more user email addresses based on the particular symbol followed by the one or more characters that represent the second user.

3. The method of claim 1, wherein the first comment is part of a comment thread corresponding to the electronic document, the method further comprising:

receiving, from a second client device associated with the second user, content of a second comment corresponding to the electronic document; and adding the second comment to the comment thread corresponding to the electronic document.

4. The method of claim 3, wherein the second comment is a reply to the first comment.

5. The method of claim 1, wherein the particular symbol of the content of the first comment comprises an @ symbol.

6. The method of claim 1, wherein the notification comprises a resource locator to a page that causes a presentation of a comment thread comprising the first comment.

7. The method of claim 1, wherein analyzing, by the server of the online document service, the content of the first comment corresponding to the electronic document comprises identifying the particular symbol followed by the one or more characters that represent the second user.

8. A system comprising:

a memory; and a processor, coupled to the memory, configured to perform operations comprising:

receiving, from a first client device associated with a first user, content of a first comment corresponding to an electronic document stored in a repository associated with an online document service and accessible by a plurality of user accounts for collaborative editing, the content of the first comment comprising i) a particular symbol followed by one or more characters that represent a second user and ii) a textual message corresponding to a first user's comment;

receiving, from the first client device, an indication that the first comment has been completed;

responsive to receiving, from the first client device, the indication that the first comment has been completed, analyzing, by the processor of the online document service, the content of the completed first comment corresponding to the electronic document to determine one or more user electronic mail (email) addresses; and responsive to analyzing the content of the completed first comment, automatically sending a notification indicating the completed first comment has been received exclusively to the one or more user email addresses determined from analyzing the particular symbol followed by the one or more characters from within the content of the completed first comment rather than to all users associated with the electronic document hosted by the online document service, the notification to display a same content of the textual message corresponding to the first user's comment.

9. The system of claim 8, wherein analyzing the content of the completed first comment corresponding to the electronic document to determine the one or more user email addresses, comprises:

detecting the particular symbol in the content of the completed first comment; and identifying the one or more user email addresses based on the particular symbol followed by the one or more characters that represent the second user.

10. The system of claim 8, wherein the first comment is part of a comment thread corresponding to the electronic document, the operations further comprising:

receiving, from a second client device associated with the second user, content of a second comment corresponding to the electronic document; and adding the second comment to the comment thread corresponding to the electronic document.

11. The system of claim 10, wherein the second comment is a reply to the first comment.

12. The system of claim 8, wherein the particular symbol of the content of the first comment comprises an @ symbol.

13. The system of claim 8, wherein the notification comprises a resource locator to a page that causes a presentation of a comment thread comprising the first comment.

14. A non-transitory computer-readable medium comprising instructions that, responsive to execution by a processor, cause the processor to perform operations comprising:

receiving, from a first client device associated with a first user, content of a first comment corresponding to an electronic document stored in a repository associated with an online document service and accessible by a plurality of user accounts for collaborative editing, the content of the first comment comprising i) a particular symbol followed by one or more characters that represent a second user and ii) a textual message corresponding to a first user's comment;

receiving, from the first client device, an indication that the first comment has been completed;

responsive to receiving, from the first client device, the indication that the first comment has been completed, analyzing, by the processor of the online document service, the content of the completed first comment corresponding to the electronic document to determine one or more user electronic mail (email) addresses; and responsive to analyzing the content of the completed first comment, automatically sending a notification indicating the completed first comment has been received exclusively to the one or more user email addresses determined from analyzing the particular symbol followed by the one or more characters from within the content of the completed first comment rather than to all users associated with the electronic document hosted by the online document service, the notification to display a same content of the textual message corresponding to the first user's comment.

15. The non-transitory computer-readable medium of claim 14, wherein analyzing the content of the completed first comment corresponding to the electronic document to determine the one or more user email addresses, comprises:

detecting the particular symbol in the content of the completed first comment; and identifying the one or more user email addresses based on the particular symbol followed by the one or more characters that represent the second user.

16. The non-transitory computer-readable medium of claim 14, wherein the first comment is part of a comment thread corresponding to the electronic document, the operations further comprising:

receiving, from a second client device associated with the second user, content of a second comment corresponding to the electronic document; and adding the second comment to the comment thread corresponding to the electronic document.

17. The non-transitory computer-readable medium of claim 16, wherein the second comment is a reply to the first comment.

* * * * *